United States Patent
Holm et al.

(10) Patent No.: US 7,895,426 B2
(45) Date of Patent: Feb. 22, 2011

(54) SECURE POWER-ON RESET ENGINE

(75) Inventors: Ingemar Holm, Stuttgart (DE); Ralph C. Koester, Tuebingen (DE); Cedric Lichtenau, Boeblingen (DE); Thomas Pflueger, Leinfelden (DE); Mack W. Riley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 11/844,449

(22) Filed: Aug. 24, 2007

(65) Prior Publication Data

US 2009/0055637 A1 Feb. 26, 2009

(51) Int. Cl.
*G06F 9/00* (2006.01)
*G06F 13/00* (2006.01)
*H03L 7/00* (2006.01)

(52) U.S. Cl. .............................. 713/1; 726/34; 327/142
(58) Field of Classification Search ....................... 713/1
See application file for complete search history.

(56) References Cited

U.S. PATENT DOCUMENTS

| | | | | |
|---|---|---|---|---|
| 4,874,965 A | * | 10/1989 | Campardo et al. | 327/143 |
| 5,376,835 A | * | 12/1994 | Van Buskirk et al. | 327/143 |
| 5,450,417 A | * | 9/1995 | Truong et al. | 714/724 |
| 6,618,312 B2 | * | 9/2003 | Cheung et al. | 365/226 |
| 7,015,732 B1 | * | 3/2006 | Holloway et al. | 327/143 |
| 7,126,391 B1 | * | 10/2006 | Smith et al. | 327/143 |
| 7,562,272 B2 | * | 7/2009 | Beattie et al. | 714/726 |
| 7,710,105 B2 | * | 5/2010 | Chan et al. | 324/142 |
| 2002/0166065 A1 | * | 11/2002 | Cheung et al. | 713/200 |

* cited by examiner

*Primary Examiner*—Suresh K Suryawanshi
(74) *Attorney, Agent, or Firm*—Stephen J. Walder, Jr.; Matthew B. Talpis

(57) ABSTRACT

A secure Power-on Reset (POR) engine is provided, inside a processor chip, which guarantees a secure initialization of the chip to enable secure code execution. External access to chip resources is limited to a very few targeted settings that do not compromise the chip security. The POR engine comprises a small state machine that runs through a predefined sequence coded in persistent memory contained in the processor chip. The state machine initializes the chip and allows external access from an external processor to only some scan chains of the processor chip in order to configure interfaces, and the like, without compromising the chip security. The state machine also manages the encryption keys that are used to verify that the code, fetched by the processor to complete the initialization in software, is not modified by a third party.

20 Claims, 5 Drawing Sheets

SECURE POWER-ON RESET ENGINE

BACKGROUND

1. Technical Field

The present application relates generally to an improved data processing system and method. More specifically, the present application is directed to a secure power-on reset engine.

2. Description of Related Art

In the early development of processors for computing devices, the processors could be relatively easily initialized by the assertion of a simple reset signal that preset key latches or all of the latches inside the processor chip to a predefined value. Modern state-of-the-art Very Large Scale Integration (VLSI) chips have a vastly higher complexity than these early processors and, as a result, require extensive initialization to configure all the internal units of a chip as well as the chip's external interfaces.

Typically, such an initialization of a VLSI chip processor requires that an external help-processor, such as a Baseboard Management Controller (BMC), read data from persistent memory storage to setup the processor to enable instruction fetching. A software controlled initialization procedure then finishes the setup of the chip. This two step process requires additional hardware located in all of the units to allow initialization of the units while the chip is running.

This process for initializing a VLSI chip-based processor would be acceptable if security were not an issue. However, if a secure boot and execution of certified code is needed, then this process of initialization is not adequate since significant security holes exist. The use of an external help-processor to arbitrarily setup the chip to a state where it can fetch instructions can lead to the bypassing of other security mechanisms and the execution of compromised code. That is, the external help-processor may be configured to read data from a portion of memory that contains compromised data which may cause compromised code to be executed by the software controlled initialization procedure. In addition, the addition of the external help-processor and the persistent memory adds cost to the system.

SUMMARY

The illustrative embodiments provide a secure Power-on Reset (POR) engine for use in processor chips, packages, or the like. The illustrative embodiments provide a small flexible POR engine inside the processor chip that guarantees a secure initialization of the chip to enable secure code execution. External access to chip resources is limited to a very few targeted settings that do not compromise the chip security.

The POR engine comprises a small state machine that runs through a predefined sequence coded in persistent memory contained in the processor chip. The state machine initializes the chip and allows external access from the external processor, e.g., the Baseboard Management Controller (BMC), to only some scan chains of the processor chip in order to configure interfaces, and the like, without compromising the chip security. The state machine also manages the encryption keys that are used to verify that the code, fetched by the processor to complete the initialization in software, is not modified by a third party.

In one illustrative embodiment, a power-on-reset (POR) apparatus is provided in an integrated circuit chip. The POR apparatus may comprise an on-chip input/output (I/O) interface and an on-chip automatic POR engine, coupled to the I/O interface, which automatically executes instructions to initialize chip logic of the integrated circuit chip to an initial clean and secure state following an initial power ramping of the integrated circuit chip. The POR apparatus may further comprise an on-chip secure control logic block, coupled to the automatic POR engine, for initializing and controlling the on-chip automatic POR engine, and filtering access to chip resources from the I/O interface such that external access to chip resources is limited to non-secure chip resources during initialization by the on-chip automatic POR engine. The on-chip secure control logic block may filter access to chip resources from the I/O interface by providing gating signals to individual portions of the chip logic such that write operations to these portions of the chip logic do not change a state of registers in these portions of chip logic and read operations to these portions of the chip logic will always return zero data.

The POR apparatus may further comprise an on-chip security information storage device which may store security information specifying an amount of access, by an external processor, to chip resources that is permitted during initialization by the on-chip automatic POR engine. The on-chip security information storage device may be a bank of electrical fuses (eFuses) that is sensed by the on-chip secure control logic block. The on-chip security control logic block may filter access to chip resources from the on-chip I/O interface by permitting external read access to global status registers of the integrated circuit chip and denying external read access to status and vital information registers of the integrated circuit chip based on the security information stored in the security information storage device. The on-chip security control logic block may further filter access to chip resources from the on-chip I/O interface by denying external write access to internal control registers of the integrated circuit chip based on the security information stored in the security information storage device.

The on-chip security information storage device may not be programmed during manufacturing and testing of the integrated circuit chip such that the integrated circuit chip operates in a non-secure mode of operation in which access to the chip resources is not filtered. After the on-chip security information storage device is programmed, the integrated circuit chip may automatically operate in a secure mode of operation such that access to the chip resources is filtered according to the security information stored in the on-chip security information storage device.

The automatic POR engine may automatically execute a sequence of instructions stored in an on-chip automatic POR register under the control of an automatic POR state machine to configure the chip logic into an initial state from which a software controlled initialization procedure executed by an external processor may then finish the setup of the chip logic. The software controlled initialization procedure may be authenticated using security key information stored in an on-chip security information storage device associated with the secure control logic block.

The secure control logic block may further comprise reset detection logic that detects a reset condition of inputs to the integrated circuit chip. In response to detection of the reset condition, the secure control logic block may cause the automatic POR engine to operate. The reset condition may be one of a cold reset condition in which a hard reset signal is asserted along with a power good signal transitioning from low to high, or a warm reset condition in which the power good signal remains high when the hard reset signal is asserted. If the reset condition is a warm reset condition, state machine logic of the automatic POR engine is placed in a hold state prior to starting a secure POR operation sequence for initializing the chip logic to an initial state from which a software controlled initialization procedure executed by an external processor may then finish the setup of the chip logic. If the reset condition is a cold reset condition, state machine logic of the automatic POR engine starts a secure POR operation sequence for initializing the chip logic to an initial state from which a software controlled initialization procedure executed by an external processor may then finish the setup of the chip logic.

The POR apparatus may further comprise an on-chip configuration data storage device which may store data required to configure the integrated circuit chip and setup secure code execution via the I/O interface in order to complete initialization of the integrated circuit chip.

In another illustrative embodiment, a method of performing a secure power-on-reset (POR) operation in an integrated circuit chip is provided. The method may comprise initializing and controlling an on-chip automatic POR engine using an on-chip secure control logic block and automatically executing, in an on-chip automatic POR engine, instructions to initialize chip logic of the integrated circuit chip to an initial clean and secure state following an initial power ramping of the integrated circuit chip. The method may further comprise filtering access to chip resources from an on-chip I/O interface, using the on-chip secure control logic block such that external access to chip resources is limited to non-secure chip resources during initialization by the on-chip automatic POR engine. The method may further comprise retrieving security information from an on-chip security information storage device, the security information specifying an amount of access, by an external processor, to chip resources that is permitted during initialization by the on-chip automatic POR engine. Moreover, the method may comprise filtering access to the chip resources based on the retrieved security information.

The on-chip security control logic block may filter access to chip resources from the I/O interface by providing gating signals to individual portions of the chip logic such that write operations to these portions of the chip logic do not change a state of registers in these portions of chip logic and read operations to these portions of the chip logic will always return zero data. The on-chip security control logic block may filter access to chip resources from the on-chip I/O interface by permitting external read access to global status registers of the integrated circuit chip and denying external read access to status and vital information registers of the integrated circuit chip based on the security information stored in the security information storage device. The on-chip security control logic block may further deny external write access to internal control registers of the integrated circuit chip based on the security information stored in the security information storage device.

The method may further comprise retrieving configuration data from an on-chip configuration data storage device, configuring chip logic of the integrated circuit chip based on the retrieved configuration data, and setting-up secure code execution via the I/O interface in order to complete initialization of the integrated circuit chip based on the configuration data. The automatic POR engine may automatically execute a sequence of instructions stored in an on-chip automatic POR register under the control of an automatic POR state machine to configure the chip logic into an initial state from which a software controlled initialization procedure executed by an external processor may then finish the setup of the chip logic.

In yet another illustrative embodiment, a computer program product comprising a computer useable medium having a computer readable program is provided. The computer readable program, when executed on a computing device, may cause the computing device to initialize and control an on-chip automatic POR engine using an on-chip secure control logic block and automatically execute, in an on-chip automatic POR engine, instructions to initialize chip logic of the integrated circuit chip to an initial clean and secure state following an initial power ramping of the integrated circuit chip. The computer readable program may further cause the computing device to filter access to chip resources from an on-chip I/O interface, using the on-chip secure control logic block such that external access to chip resources is limited to non-secure chip resources during initialization by the on-chip automatic POR engine.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide a secure Power-on Reset (POR) engine for use in processor chips, packages, and the like. As such, the mechanisms of the illustrative embodiments may be implemented in any processor architecture in which a secure POR functionality is desired. Thus, for example, the mechanisms of the illustrative embodiments may be implemented in single processor architectures, multiple processor architectures, Symmetric Multi-Processor (SMP) architectures, heterogeneous multiprocessor architectures, and the like. One processor architecture in which the illustrative embodiments may be implemented is a heterogeneous multiprocessor system-on-a-chip (SoC). One example of such a heterogeneous multiprocessor SoC is the Cell Broadband Engine (CBE) available from International Business Machines Corporation of Armonk, N.Y.

Figure 1:
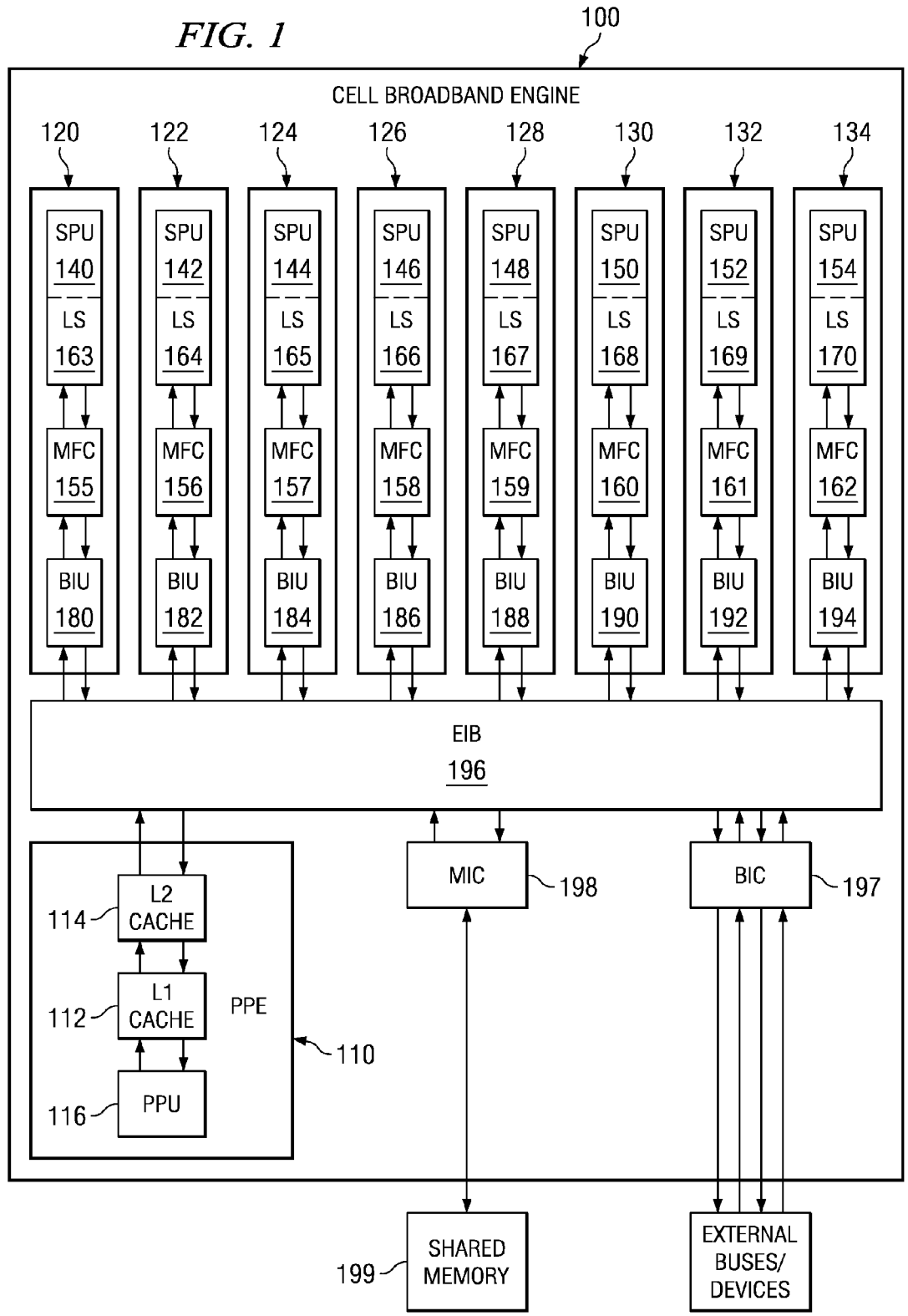
FIG. 1 is an exemplary block diagram of a heterogeneous multiprocessor system-on-a-chip (SoC) in which the illustrative embodiments may be implemented.

FIG. 1 is an exemplary block diagram of a heterogeneous multiprocessor system-on-a-chip (SoC) in which the illustrative embodiments may be implemented. The exemplary data processing system shown in FIG. 1 is an example of a CBE data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU executes vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

The POR engine of the illustrative embodiments allows a secure power-on reset functional of a SoC, such as the CBE 100 in FIG. 1. The POR engine further allows secure external intervention for configuration purposes. The power-on reset procedure performed by the POR engine of the illustrative embodiments is referred to as a secure automatic power-on reset (sPOR) procedure or operation. This sPOR operation will now be described with regard to the primary operational components of a POR engine in accordance with one illustrative embodiment.

Figure 2:
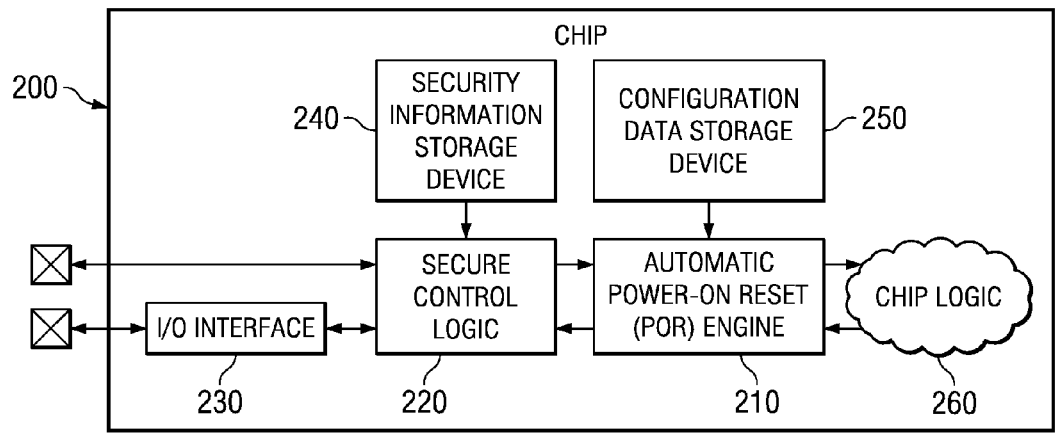
FIG. 2 is an exemplary block diagram of a processor chip in accordance with one illustrative embodiment.

FIG. 2 is an exemplary block diagram of a processor chip in which the primary operational components of the illustrative embodiments are shown. The elements shown in FIG. 2, and the block diagrams in further figures hereafter, are preferably implemented as hardware elements on an integrated circuit chip. However, it should be appreciated that the elements of FIG. 2, and the block diagrams in the further figures hereafter, in some illustrative embodiments, may be implemented as software stored in non-volatile memory built into a integrated circuit chip and which is loaded by one or more processing devices provided on the chip. For purposes of the following description, it will be assumed that the elements shown in FIG. 2, and the figures set forth hereafter, are implemented in hardware on an integrated circuit chip.

As shown in FIG. 2, the POR engine of the illustrative embodiments includes automatic Power-on Reset (POR) engine 210, secure control logic block 220, Input/Output (I/O) interface 230, an on-chip security information storage device 240, an on-chip configuration data storage device 250, and chip logic 260. The secure control logic block 220 initializes and controls the automatic POR engine 210 and filters accesses to the chip from the I/O interface 230. The on-chip security information storage device 240 specifies how much access to the chip will be allowed during the sPOR operation. The automatic POR engine 210 executes various instructions and performs various operations required for initialization of the chip logic 260, e.g., one or more processors or processing units. The on-chip configuration data storage device 250 stores data required to configure the chip 200 and setup secure code execution via the I/O interface 230 in order to complete initialization of the chip 200. The secure control logic block 220 limits access to the chip by external processors or other devices to only the non-sensitive parts of the chip.

In operation, after an initial power ramping, a hardwired sequence of operations is executed by the automatic POR (APOR) engine 210 under control of the secure control logic block 220 to bring the chip 200 to an initial clean and secure state. The security information contained in the security information storage device 240, which in one illustrative embodiment is a bank of electric fuses (eFuses), is read to determine how much access to the chip internal logic, via the I/O interface 230, will be granted to an external processor, e.g., the BMC. For example, external read access to the chip's global status registers is permitted in most cases, however, depending on the security information, reading of detailed status/vital information in registers of the chip logic 260 and writing of internal chip control registers in the chip logic 260 can be denied.

During the time the chip is being brought into an initial clean and secure state, no external access to resources on the chip 200 is permitted. In order to prevent external access to resources on the chip, the secure control logic 220 will provide gating signals for the individual portions of the chip internal logic 260, such that a write operation will not change the state of the selected register in the portion of chip internal logic 260 and a read of a status register in the chip internal logic 260 will return always zero data, for example.

It should be noted that, during the manufacturing and testing of the chip 200, the chip is in a non-secure state to allow access to all internal chip resources. This non-secure state is made possible by the fact that the security information storage device 240 has not yet been programmed with the security information identifying the amount of external access to chip resources that is afforded to external devices during initialization of the chip 200. That is, to allow access to the security information storage device 240, such as for blowing of eFuses in order to encode the security information, and to exercise and stimulate the Array Built-In Self-Test (ABIST) and Logic Built-In Self-Test (LBIST) engines of the processor, the chip must be in a non-secure state of operation. After the programming of the security information into the security information storage device 240, such as via blowing appropriate eFuses in a bank of eFuses to thereby encode the security information into the chip 200, no more non-secure access to the chip 200 is permitted beyond that specifically allowed by the security information stored in the security information storage device 240. Therefore, no further testing of the chip 200 will be permitted after programming of the security information into the security information storage device 240.

After reading in the security information from the security information storage device 240, the secure control logic block 220 waits for an external signal to be toggled and, in response to the toggling of the external signal, the secure control logic block 220 proceeds with the secure power-on reset (sPOR) operation of the chip 200. During the time of the sPOR operation of the chip 200, external accesses to non-security relevant configuration rings of latches and to status registers associated with the APOR engine 210 is permitted through the I/O interface 230. In addition, the APOR engine 210 may access the configuration data storage device 250 to read configuration data, which may or may not be encrypted, for configuring the chip 200. This configuration data may include, for example, unit identifiers needed to configure the EIB bus 196 by assigning consistent values to all its participants. Other configuration data may be used to adjust queue lengths, disable individual functions, and the like.

The sPOR operation involves having the APOR engine 210 execute a sequence of instructions stored in an on-chip APOR register under the control of an APOR state machine. The sequence of instructions operates to configure the chip logic 260 into an initial state from which a software controlled initialization procedure may then finish the setup of the chip logic 260 of the chip 200. The particular sequence of instructions executed by APOR engine 210 may be different depending upon the particular chip 200 architecture in which the mechanisms of the illustrative embodiments is implemented.

Once the chip logic 260 is placed in a secure initial configuration state based on the operation of the APOR engine 210 and the configuration data retrieved from configuration data storage device 250, the secure control logic block 220 may pass control to a software controlled initialization procedure, which may be performed by an external processor, such as one of the SPEs 120-134 in FIG. 1, for example. This software controlled initialization procedure is similar to the BIOS operations performed in a personal computer.

The secure control logic block 220 may, in reading the security information from the security information storage device 240, retrieve security key information from the security information storage device 240 and utilize this security key information to authenticate any software loaded by the secure control logic block 220, or otherwise permitted to access the chip logic 260, for finishing the configuring of the chip logic 260 of the chip 200. Thus, the initial configuration state of the chip logic 260 is made secure by preventing external access, i.e. access from outside the chip 200, to security sensitive portions of the chip 200 and performing the initial configuring of the chip logic 260 using on-chip mechanisms. Moreover, the final configuration state of the chip logic 260 is made secure by authentication of the software controlled configuration process using on-chip security information. Since the security of the configuration process is completely dependent upon on-chip mechanisms, the ability to compromise the security from outside the chip 200 is minimized.

Figure 3:
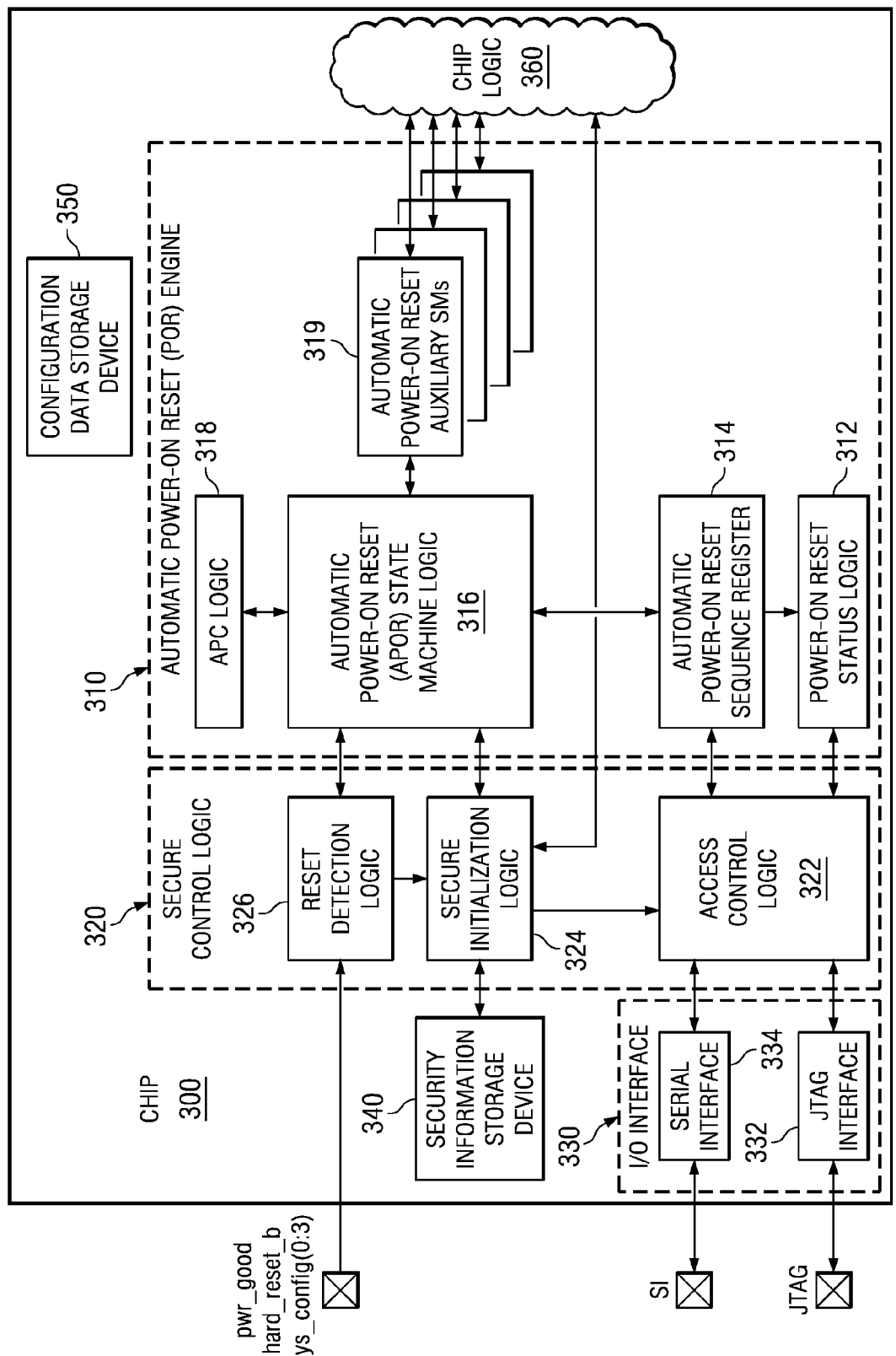
FIG. 3 is an exemplary block diagram of a processor chip, in accordance with one illustrative embodiment, in which the primary operational elements of a secure control logic block and an automated power-on reset engine are illustrated.

FIG. 3 is an exemplary block diagram of a processor chip, in accordance with one illustrative embodiment, in which the primary operational elements of a secure control logic block and an automated power-on reset engine are illustrated. As shown in FIG. 3, the automatic POR (APOR) engine 310 includes POR status logic 312, an APOR sequence register 314, APOR state machine logic 316, a program counter (APC) logic 318, and one or more APOR auxiliary state machines 319. The APOR state machine logic 316 controls the transition between defined states of the APOR engine 310. The APOR sequence register 314 contains the APOR instructions for each of these states. The APOR auxiliary state machines 319 each execute an instruction corresponding to the transition of states specified by the APOR state machine logic 316 and as stored in the APOR sequence register 314. The POR status logic 312 keeps track of the current chip and POR state. A portion of the APOR engine 310, e.g., the APOR sequence register 314 and the program counter logic 318, can be accessed through a standard interface, e.g., the Joint Test Action Group (JTAG) interface 332, as part of a global chip scan ring if allowed by the secure state, i.e. if allowed by the gate signals generated by decoding the security information which controls the access to internal chip information.

The secure control logic block 320 includes access control logic 322, secure initialization logic 324, and reset detection logic 326. The reset detection logic 326 detects a reset condition of the inputs to the chip. This reset condition may be one of two different types: a cold start reset and a warm start reset. The reset detection logic 326 determines whether a cold start reset or a warm start reset condition is present and, depending upon which reset condition is present, performs particular operations for placing the chip 300 in a state where the sPOR operation may begin.

The secure initialization logic 324 provides the hardwired sequence of instructions that are executed after power-on but before the APOR state machine logic 316 runs a configuration sequence for configuring the chip 300. The main function of the hardwired secure initialization logic 324 is to read the security information from the security information storage device 340 and the configuration data from the configuration data storage device 350 (such as by sensing the state of the eFuses), reset the chip logic 360 to a default clean and secure state, start the clocks of the chip logic 360, and ensure a minimum delay from power good until the APOR state machine is activated.

The I/O interface 330 includes a serial interface 334 and a JTAG interface 332. The serial interface 334 is used for normal functional mode and can only access limited chip resources. The serial interface 334 is used to load the chip configuration ring, load the initial program code, and the like. The JTAG interface 332 is used for debugging and bring-up activities since it can access, in a non-secure mode, all chip resources.

The chip logic 360 may include a number of logic elements including a system phase locked loop (PLL) control logic block and PLL configuration register, chip clock grid, various status and vital information registers, control registers and the like. The number of different logic elements and combinations of logic elements is quite vast and thus, rather than detailing these out here, the chip logic 360 is shown in general but is not intended to state or imply any limitation as to the types of logic that may be included therein. A PLL control logic block, which may be provided in the chip logic 360, controls the clock signal delivered to the chip clock grid. An additional function of such a PLL is to delay the chip input power_good signal and deliver a delayed version to the secure control logic block 320. The power_good signal only rises after the clock on the clock grid is active.

In operation, when the power_good input pin is inactive, i.e. the power_good signal is not being asserted at the pin, the grid clock (not shown) of the chip 300 is forced to an inactive state. When the power_good signal rises, i.e. the power_good signal, received from the power system of the data processing system in which the chip 300 is placed, is asserted at the pin, the first clock pulse on the clock grid puts the chip 300 into a secure state. In addition the first clock pulse also resets POR, JTAG, and clock control logic. The APOR engine 310 activates the system PLL of the chip logic 360 for generating a system clock and activates the secure initialization logic 324 of the secure control logic block 320.

The secure initialization logic 324 reads the security information from the security information storage device 340. In an embodiment in which the security information storage device 340 is a bank of eFuses, the secure initialization logic 324 senses the state of the eFuses, e.g., blown or not blown, to read the security information as well as the configuration data (which may also be stored in a bank of eFuses). The secure initialization logic 324 further loads and sets a PLL configuration register, provided in the chip logic 360, controls the switching of the grid clock from a reference clock to the PLL clock, and imposes a minimum delay for the rise of the hard_reset_b signal.

During the time the hard_reset_b is active, and thus the hard_reset is low or not active, all latches in the chip core and the I/O domains of the chip logic 360 are scanned to zero and all non-scannable latches in the chip logic 360 are initialized. The rise of the hard_reset_b signal triggers the APOR state machine logic 316 which executes a sequence of APOR instructions, provided in the APOR sequence register 314, which will trigger different actions. The default sequence may be changed using sys_config pins to select available debug modes if the security mode allows, the security mode being read with the security information from the security information storage device 340 during the non-interruptable initial part of the secure POR operation described previously.

During testing mode, the POR sequence may be modified by testing equipment or other external devices using the standard JTAG interface 332.

The APOR state machine logic 316 directs the actual execution of the sequence of instructions, in the APOR sequence register 314, by the auxiliary APOR state machines 319. The APOR state machine logic 316 transitions between a plurality of states, as discussed hereafter, to control the execution of these instructions by the auxiliary APOR state machines 319. The APOR state machine logic 316 essentially fetches an instruction pointed to by the program counter APC logic 318 in the APOR sequence register 314, decodes the instruction, and starts the execution of the instruction by a corresponding auxiliary APOR state machine 319. The APOR state machine logic 316 then waits until the auxiliary APOR state machine 319 signals completion of the instruction execution. The APC logic 318 then increments the program counter and the APOR state machine logic 316 loops.

As instructions are fetched from the APOR sequence register 314 by the APOR state machine logic 316, the POR status logic 312 updates the current state of the APOR engine 310. The POR status logic 312 may further store information regarding completion of the instructions by the auxiliary APOR state machines 319, errors encountered during operation of the APOR engine 310 (such as in response to an unauthorized access request detected by the access control logic 322), timeout conditions encountered by the APOR engine 310, and other state information. This status information is retrievable by external devices via the access control logic 322 of the secure control logic 320 and the I/O interface 330. The status information is used as a final check that the APOR engine 310 sequence has completed correctly. Part of a typical APOR engine 310 sequence of instructions could be, for example, scan zero to all latches, load array repair chains, initialize all arrays, and scan zero to all latches.

As mentioned above, the reset detection logic 326 of the secure control logic 320 may detect either a cold start reset or a warm start reset for resetting the state of the chip logic 360. A cold start of the chip 300 happens when a full power on reset occurs. The transition of the power_good signal from a low level to a high level with the hard_reset_b signal low (and thus, its complement, the hard_reset signal being high), will result in a cold start of the chip 300. A simplified timing diagram of the cold start sequence is shown in FIG. 4.

Figure 4:
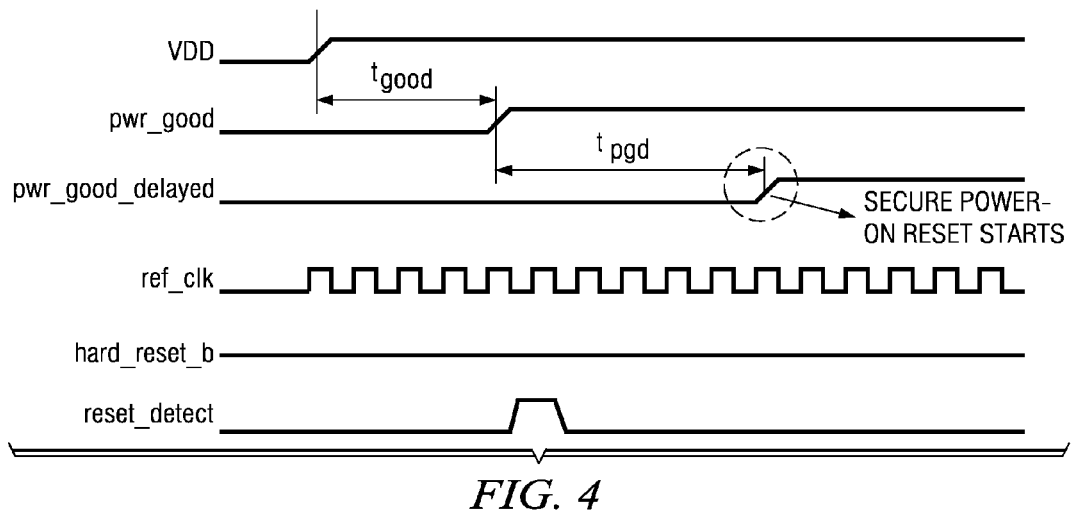
FIG. 4 is an exemplary timing diagram illustrating a cold start reset sequence in accordance with one illustrative embodiment.

As shown in FIG. 4, after the elapse of a time period $t_{good}$ after an initial supply of voltage VDD, the power good signal pwr_good is asserted (i.e., transitions to a high state) indicating that the input power is at a stable state. Upon supply of the input voltage VDD, the reference clock ref_clk is started. With the assertion of the power_good signal, a reset_detect signal is transitioned high causing the sPOR operation to start following a power good delay time period $t_{pgd}$. When a delayed power good signal (pwr_good_delayed) is asserted, as discussed previously, the sPOR operation of the APOR state machine logic 316 is initiated. That is, detection of the cold start sequence by the reset detection logic 326 results in an internally generated pulse sent to the APOR state machine logic 316 that starts the state sequence of the APOR state machine logic 316.

Figure 5:
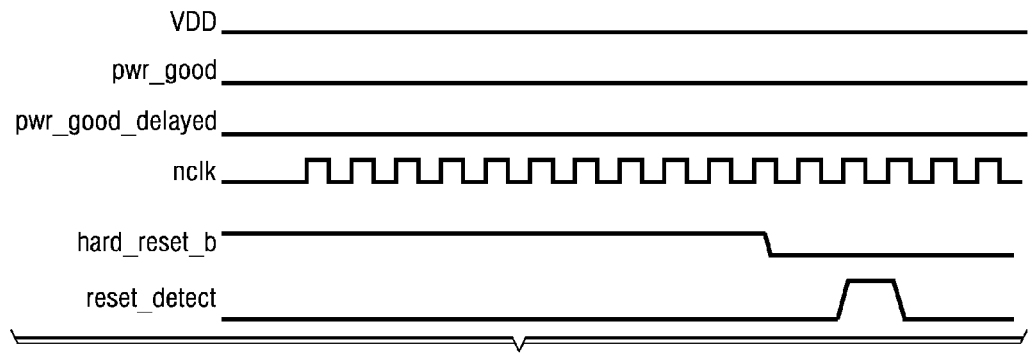
FIG. 5 is an exemplary timing diagram illustrating a warm start reset sequence in accordance with one illustrative embodiment.

FIG. 5 is an exemplary timing diagram illustrating a warm start reset sequence in accordance with one illustrative embodiment. As shown in FIG. 5, a warm start reset sequence occurs when the chip power supplies (VDD) and reference clocks (nclk) are all at a valid level and the hard_reset b signal transitions from a high to a low state while the power good signal power_good remains high. Such a situation may occur in response to the pressing of a reset button on the data processing device, turning the power on (power_good), or any other event or input that would cause the hard_reset_b signal to drop. Upon detecting the warm start reset by the reset detection logic 326, an internal reset pulse (reset_detect) is generated. This reset pulse, generated in the reset detection logic 326, causes the APOR state machine logic 316 to place the chip in a hold state before starting the sPOR operation sequence. The hold state is used to stop all clock activity and place the chip into in a quiet state. The APOR engine 310 treats the cold start reset and warm start reset conditions similarly with one difference in that the full_scan0 starts after the reading of the security information from the security information storage device 340 when a warm start reset takes place. That is, just as with the cold start reset discussed above, the APOR state machine logic 316 performs the sPOR operation sequence following a $t_{pgd}$ time period from detecting the reset_detect pulse. In other words, in the cold start case, the chip is in a totally unknown state, including states that can never be reached during normal operation. The warm reset case starts with a functionally working/initialized chip and thus, different operations are utilized.

Figure 6:
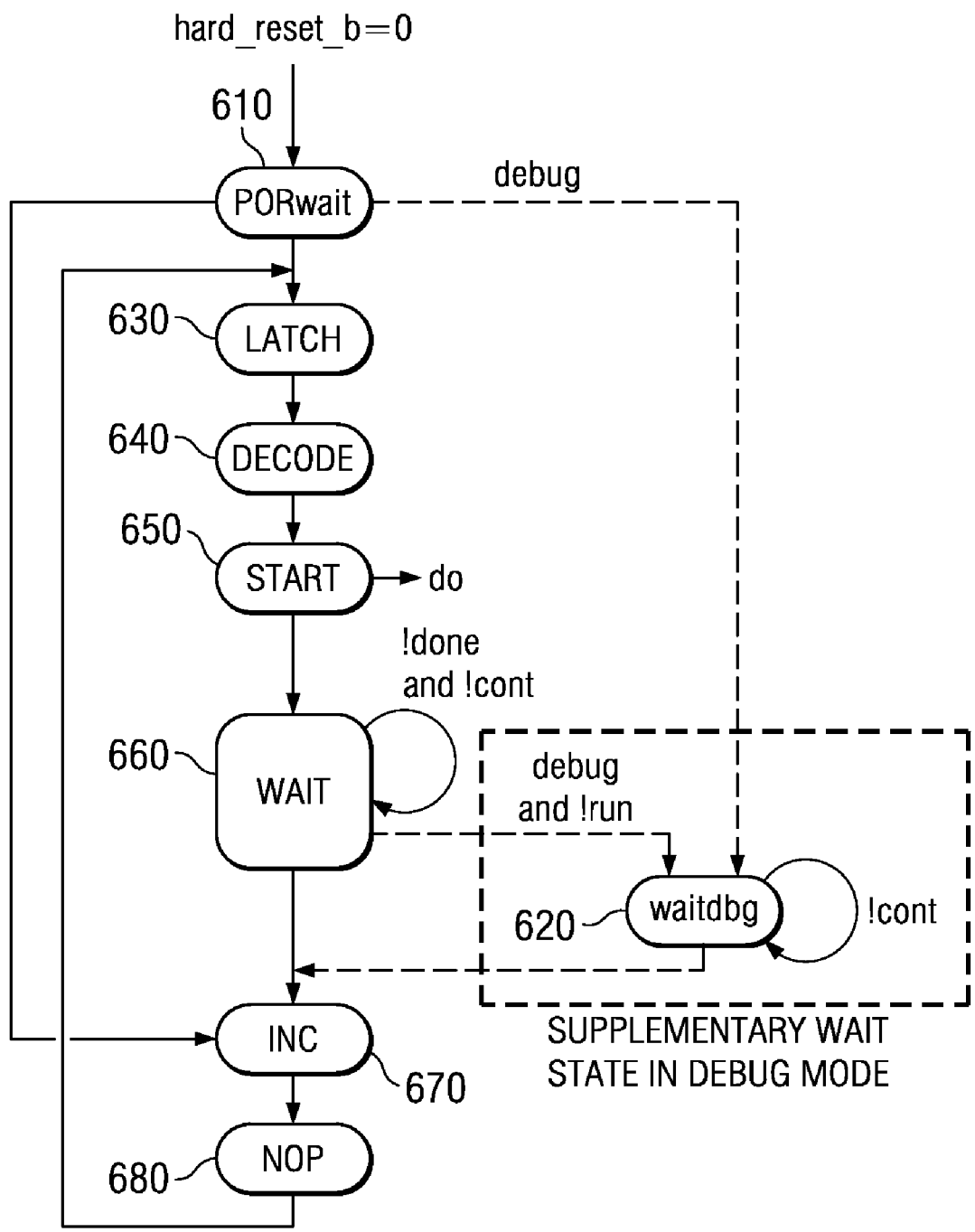
FIG. 6 is an exemplary state diagram illustrating an operation of the APOR state machine logic of the APOR engine in accordance with one illustrative embodiment.

FIG. 6 is an exemplary state diagram illustrating an operation of the APOR state machine logic of the APOR engine in accordance with one illustrative embodiment. As shown in FIG. 6, and with continued reference to FIG. 3, after a hard_reset_b signal is asserted or raised, the program counter APC logic 318 is cleared and the APOR state machine logic 316 first enters a POR wait state 610. In debug mode, this state transitions to a wait_dbg state 620 to allow reprogramming of the APOR instruction sequence in the APOR sequence register 314. In non-debug mode, i.e. after security information has been written to the security information storage device 340, the state transitions to a latch state 630 where the next instruction in the APOR sequence, as pointed to by the program counter APC logic 318, is latched into the APOR state machine logic 316 from the APOR sequence register 314. The state then transitions to a decode state 640 where the latched in instruction is decoded using a decoder provided in the APOR state machine logic 316.

The state of the APOR state machine logic 316 then transitions to a start state 650 where the APOR state machine logic 316 starts execution of the instruction by a corresponding auxiliary state machine 319 (i.e. the "do" branch of the state diagram). The decoding of the instruction identifies which auxiliary state machine 319 to start. The APOR state machine logic 316 then transitions to a wait state 660 where the APOR state machine logic 316 waits for a completion signal from the auxiliary state machine 319 or a continue command, discussed hereafter, which may be received, for example, through the JTAG interface 332, such as during debugging or testing of the chip 300.

The state of the APOR state machine logic 316 then transitions to an increment state 670 where the program counter APC logic 318 is incremented. The state then transitions to a nop state 680, for reset and timing purposes, and then loops back to the latch state 630. The state transitions may then be repeated for the next instruction in the sequence.

The end of the APOR sequence is reached when the counter value of the APC logic 318 reaches a predefined value, e.g., a number of instructions specified in the APOR sequence register 314, which will cause the APOR state machine to be stopped. After completion of the instruction in the last entry of the sPOR sequence stored in the APOR sequence register 314, an APOR complete bit in an APOR status register of the POR status logic 312 is set and the APOR state machine logic 316 transitions to an idle state (not shown) via a number of nop operations.

It should be noted that upon entering the wait state 660, a watch-dog counter for detecting a timeout condition may be started for array built-in self-test initialization instructions. All other instructions will not have such a timeout protection since their "complete" signals are controlled by internal counters or external agents, e.g., the system controller. After a timeout period, e.g., 8 ms or the like, a timeout bit may be set in an APOR status register of the POR status logic 312 and the program counter APC logic 318 may be incremented to execute the next instruction in the APOR sequence register 314. In secure mode, if an unauthorized access request is detected by the access control logic 322 of the secure control logic 320, then a secure error condition is generated causing the APOR state machine logic 316 to be immediately stopped and an error indication to be set in the APOR status register of the POR status logic 312.

In debug or test mode, a supplementary wait state, wait_dbg 620, is entered after the nominal wait state 660 to allow intervention during the sPOR operation. A POR continue command from the JTAG interface 332, i.e. from an external processor such as a BMC, test equipment, or the like, can be used to leave this wait_dbg state 620. There exists other special modifications to the continue command with different side effects. For example, a "continue and run" command may be used to leave the wait_dbg state 620 and execute the stored sPOR sequence but will skip all future wait_dbg states.

A "continue and load" command causes the wait_dbg state 620 to be exited but will replace the normal value in the APOR sequence register 314 with a value supplied via the JTAG interface 332. The program counter APC logic 318 may be incremented as for a continue command alone. This works as a skip command if the value supplied is a nop operation.

A "load" command without the continue command may be used to leave the wait_dbg state 620 but will insert the value supplied via the JTAG interface 332 into the APOR sequence register 314. The program counter is not incremented in this case. A "load" command together with a "run" command temporarily leaves the debug mode of operation and executes a stored sPOR sequence until the next sPOR instruction equals a value supplied via the JTAG interface 332.

Thus, the mechanisms of the illustrative embodiments provide an on-chip APOR engine 310 and secure control logic 320 for controlling the initial configuration of chip logic 360 in a secure manner such that external access to security sensitive portions of the chip 300 is restricted. Moreover, upon completion of the initial configuration of the chip logic 360, control may be passed to software based configuration procedures to complete the configuring of the chip logic 360 in a secure manner. The secure control logic 320 may authenticate such software-based configuration procedures using on-chip security key information before allowing the software to access the security sensitive portions of the chip 300.

The passing of control to software may be performed by each of the processors, e.g., SPEs 120-134 in FIG. 1, performing a software-based configuration procedure. A value in the configuration data specifies one of the SPEs 120-134 as a master SPE, e.g., SPE 120. The APOR engine 310 may then send a signal to all SPEs 120-134 to clear and reset all information and to enter an "isolate state." All of the SPEs 120-134 then signal back to the APOR engine 310 when this is done. The master SPE 120 may then continue, using code in an on-chip ROM by fetching code from an external source, and validate the loaded code using the on-chip security key. If all of these procedures complete properly, the master SPE 120 signals back to the APOR engine 310 that it is valid to start the PPU 116 for regular operation.

Figure 7:
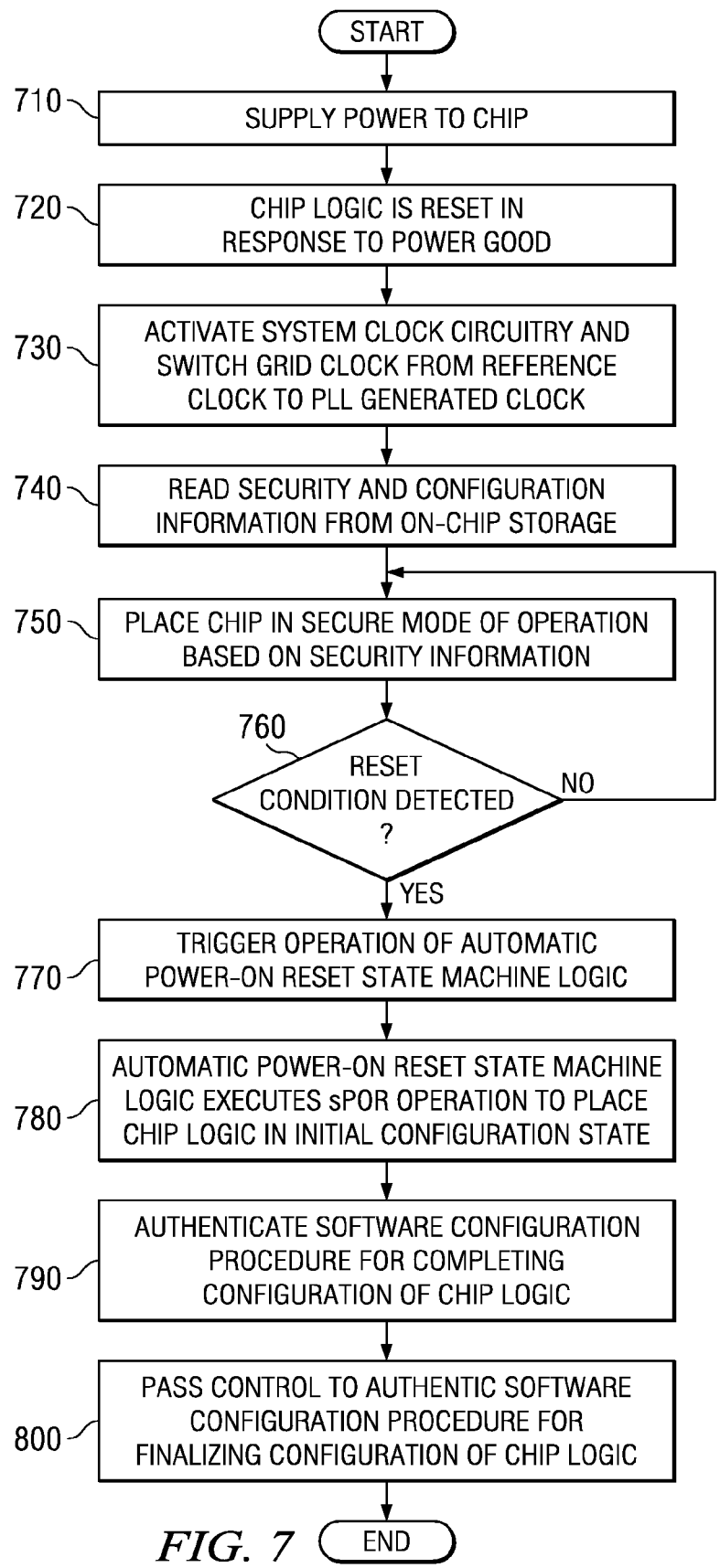
FIG. 7 is a flowchart outlining an exemplary operation for initializing a chip in accordance with one illustrative embodiment.

FIG. 7 is a flowchart outlining an exemplary operation for initializing a chip in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As shown in FIG. 7, the operation starts with power being supplied to the chip by a power system of the data processing system in which the chip is provided (step 710). APOR, JTAG, and clock control logic is reset in response to the supply of power to the chip (step 720). The system clock circuitry is activated and the grid clock of the chip is switched from a reference clock to an on-chip PLL generated clock (step 730). Secure initialization logic reads security and configuration information from security and configuration information storage devices on-chip (step 740). It should be noted that during this time period, no external access to the resources of the chip is permitted, i.e. the access control logic of the secure control logic of the chip blocks any access to the chip resources.

The security control logic of the chip then places the chip in a secure mode of operation based on security information retrieved from the security information storage device (step 750). A determination is made as to whether a reset condition is detected by the reset detection logic of the security control logic (step 760). If a reset condition is not detected, the operation returns to step 750. If a reset condition is detected by reset detection logic (step 760) the reset detection logic triggers operation of the APOR state machine logic (step 770). The APOR state machine then executes one or more instructions of an sPOR operation stored in an APOR sequence register to thereby configure the chip logic of the chip to an initial configuration from which a software configuration procedure may complete the configuration of the chip logic (step 780). Once the APOR state machine execution of the sPOR operation is complete, the secure control logic of the chip authenticates a software configuration procedure for completing the configuration of the chip logic based on security key information stored on-chip (step 790). Assuming that the software configuration procedure is authentic, control is passed to the authentic software configuration procedure for finalizing the configuration of the chip logic (step 800). The operation then terminates.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the portions of the illustrative embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

The circuitry as described above may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design may then be converted into the appropriate format (e.g., GDSII) for the fabrication of photolithographic masks, which typically include multiple copies of the chip design in question that are to be formed on a wafer. The photolithographic masks may be utilized to define areas of the wafer (and/or the layers thereon) to be etched or otherwise processed.

The resulting integrated circuit chips may be distributed by the fabricator in raw wafer form (that is, as a single wafer that has multiple unpackaged chips), as a bare die, or in a packaged form. In the latter case the chip may be mounted in a single chip package (such as a plastic carrier, with leads that are affixed to a motherboard or other higher level carrier) or in a multi-chip package (such as a ceramic carrier that has either or both surface interconnections or buried interconnections). In any case, the chip may then be integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A power-on-reset (POR) apparatus, provided in an integrated circuit chip, comprising:
   an on-chip input/output (I/O) interface;
   an on-chip automatic POR engine, coupled to the I/O interface, which automatically executes instructions to initialize chip logic of the integrated circuit chip to an initial clean and secure state following an initial power ramping of the integrated circuit chip; and
   an on-chip secure control logic block, coupled to the automatic POR engine, for initializing and controlling the on-chip automatic POR engine, and filtering access to chip resources from the I/O interface such that external access to chip resources, by devices external to the chip, is limited to non-secure chip resources during initialization by the on-chip automatic POR engine, while external access to secure chi resources is blocked during initialization by the on-chop automatic POR engine.

2. The apparatus of claim 1, wherein the on-chip secure control logic block filters access to chip resources from the I/O interface by providing gating signals to individual portions of the chip logic such that write operations to these portions of the chip logic do not change a state of registers in these portions of chip logic and read operations to these portions of the chip logic will always return zero data.

3. The apparatus of claim 1, further comprising:
   an on-chip security information storage device which stores security information specifying an amount of access, by an external processor, to chip resources that is permitted during initialization by the on-chip automatic POR engine.

4. The apparatus of claim 3, wherein the on-chip security information storage device is a bank of electrical fuses (eFuses) that is sensed by the on-chip secure control logic block.

5. The apparatus of claim 3, wherein the on-chip security control logic block filters access to chip resources from the on-chip I/O interface by:
   permitting external read access to global status registers of the integrated circuit chip;
   denying external read access to status and vital information registers of the integrated circuit chip based on the security information stored in the security information storage device; and
   denying external write access to internal control registers of the integrated circuit chip based on the security information stored in the security information storage device.

6. The apparatus of claim 3, wherein the on-chip security information storage device is not programmed during manufacturing and testing of the integrated circuit chip such that the integrated circuit chip operates in a non-secure mode of operation in which access to the chip resources is not filtered, and wherein after the on-chip security information storage device is programmed, the integrated circuit chip automatically operates in a secure mode of operation such that access to the chip resources is filtered according to the security information stored in the on-chip security information storage device.

7. The apparatus of claim 1, further comprising:
   an on-chip configuration data storage device which stores data required to configure the integrated circuit chip and setup secure code execution via the I/O interface in order to complete initialization of the integrated circuit chip.

8. The apparatus of claim 1, wherein the automatic POR engine automatically executes a sequence of instructions stored in an on-chip automatic POR register under the control of an automatic POR state machine to configure the chip logic into an initial state from which a software controlled initialization procedure executed by an external processor may then finish the setup of the chip logic.

9. The apparatus of claim 8, wherein the software controlled initialization procedure is authenticated using security key information stored in an on-chip security information storage device associated with the secure control logic block.

10. The apparatus of claim 1, wherein the secure control logic block further comprises reset detection logic that detects a reset condition of inputs to the integrated circuit chip, and wherein, in response to detection of the reset condition, the secure control logic block causes the automatic POR engine to operate.

11. The apparatus of claim 10, wherein the reset condition is one of a cold reset condition in which a hard reset signal is asserted along with a power good signal transitioning from low to high, or a warm reset condition in which the power good signal remains high when the hard reset signal is asserted.

12. The apparatus of claim 11, wherein if the reset condition is a warm reset condition, state machine logic of the automatic POR engine is placed in a hold state prior to starting a secure POR operation sequence for initializing the chip logic to an initial state from which a software controlled initialization procedure executed by an external processor may then finish the setup of the chip logic.

13. The apparatus of claim 11, wherein if the reset condition is a cold reset condition, state machine logic of the automatic POR engine starts a secure POR operation sequence for initializing the chip logic to an initial state from which a software controlled initialization procedure executed by an external processor may then finish the setup of the chip logic.

14. A method of performing a secure power-on-reset (POR) operation in an integrated circuit chip, comprising:
   initializing and controlling an on-chip automatic POR engine using an on-chip secure control logic block;
   automatically executing, in an on-chip automatic POR engine, instructions to initialize chip logic of the integrated circuit chip to an initial clean and secure state following an initial power ramping of the integrated circuit chip; and
   filtering access to chip resources from an on-chip I/O interface, using the on-chip secure control logic block such that external access to chip resources, by devices external to the chip, is limited to non-secure chip resources during initialization by the on-chip automatic POR engine, while external access to secure chip resources is blocked during initialization by the on-chip automatic POR engine.

15. The method of claim 14, wherein the on-chip security control logic block filters access to chip resources from the I/O interface by providing gating signals to individual portions of the chip logic such that write operations to these portions of the chip logic do not change a state of registers in these portions of chip logic and read operations to these portions of the chip logic will always return zero data.

16. The method of claim 14, further comprising:
retrieving security information from an on-chip security information storage device, the security information specifying an amount of access, by an external processor, to chip resources that is permitted during initialization by the on-chip automatic POR engine; and
filtering access to the chip resources based on the retrieved security information.

17. The method of claim 14, wherein the on-chip security control logic block filters access to chip resources from the on-chip I/O interface by:
permitting external read access to global status registers of the integrated circuit chip;
denying external read access to status and vital information registers of the integrated circuit chip based on the security information stored in the security information storage device; and
denying external write access to internal control registers of the integrated circuit chip based on the security information stored in the security information storage device.

18. The method of claim 14, further comprising:
retrieving configuration data from an on-chip configuration data storage device;
configuring chip logic of the integrated circuit chip based on the retrieved configuration data; and
setting-up secure code execution via the I/O interface in order to complete initialization of the integrated circuit chip based on the configuration data.

19. The method of claim 14, wherein the automatic POR engine automatically executes a sequence of instructions stored in an on-chip automatic POR register under the control of an automatic POR state machine to configure the chip logic into an initial state from which a software controlled initialization procedure executed by an external processor may then finish the setup of the chip logic.

20. A computer program product comprising a computer useable medium having a computer readable program, wherein the computer readable program, when executed on a computing device, causes the computing device to:
initialize and control an on-chip automatic POR engine using an on-chip secure control logic block;
automatically execute, in an on-chip automatic POR engine, instructions to initialize chip logic of the integrated circuit chip to an initial clean and secure state following an initial power ramping of the integrated circuit chip; and
filter access to chip resources from an on-chip I/O interface, using the on-chip secure control logic block such that external access to chip resources, by devices external to the chip, is limited to non-secure chip resources during initialization by the on-chip automatic POR engine, while external access to secure chip resources is blocked during initialization by the on-chip automatic POR engine.

\* \* \* \* \*